United States Patent [19]

Haseloff

[11] 4,024,695
[45] May 24, 1977

[54] LAWN MOWER

[76] Inventor: Fritz Haseloff, Behringstrasse, 35 Kassel, Germany

[22] Filed: Aug. 7, 1975

[21] Appl. No.: 602,832

Related U.S. Application Data

[63] Continuation-in-part of Ser. No. 449,257, March 8, 1974, abandoned.

[52] U.S. Cl. .............................. 56/15.4; 180/19 S
[51] Int. Cl.² ........................................ A01D 53/00
[58] Field of Search .............. 56/17.2, 17.4, 17.1, 56/13.6, 255, 295, 11.2, 13.8, 15.4, 16.7; 180/19 R, 19 S

[56] References Cited

UNITED STATES PATENTS

| 2,522,112 | 9/1950 | Gilmour | 56/17.2 |
| 3,112,594 | 12/1963 | Hollenbeck | 56/15.4 |
| 3,141,283 | 7/1964 | Swindler | 56/17.2 |
| 3,780,504 | 12/1973 | Haseloff | 56/13.6 |

*Primary Examiner*—Russell R. Kinsey
*Attorney, Agent, or Firm*—Andrus, Sceales, Starke & Sawall

[57] ABSTRACT

A rotary lawn mower having a pair of rotary blades, each of which is carried by driven cup-shaped hub. Wheels are disposed within each hub, while a central pivotable wheel is located to the rear of the blade and is positioned along the central longitudinal axis of the mower. The rear wheel can be pivoted by a steering mechanism located on the handle of the mower to provide steering.

3 Claims, 4 Drawing Figures

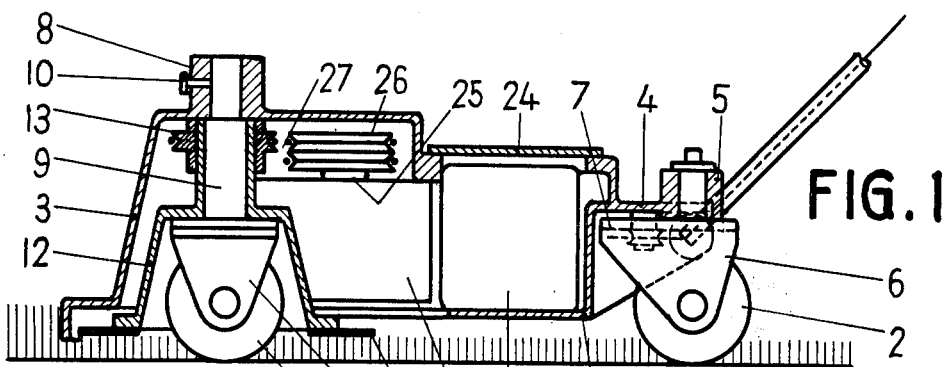
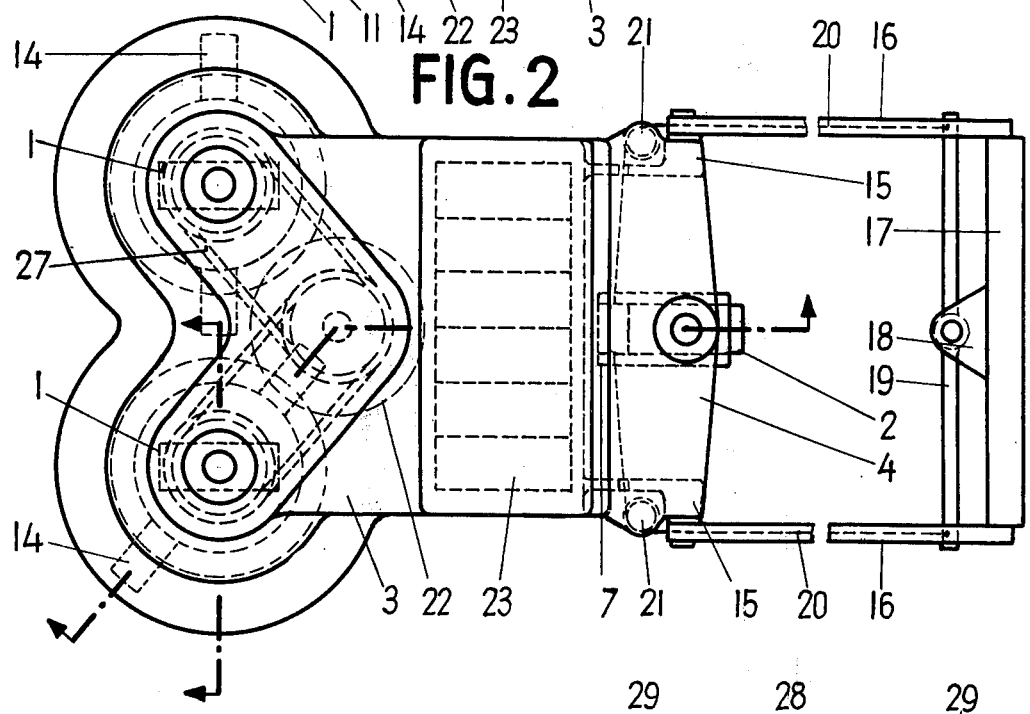
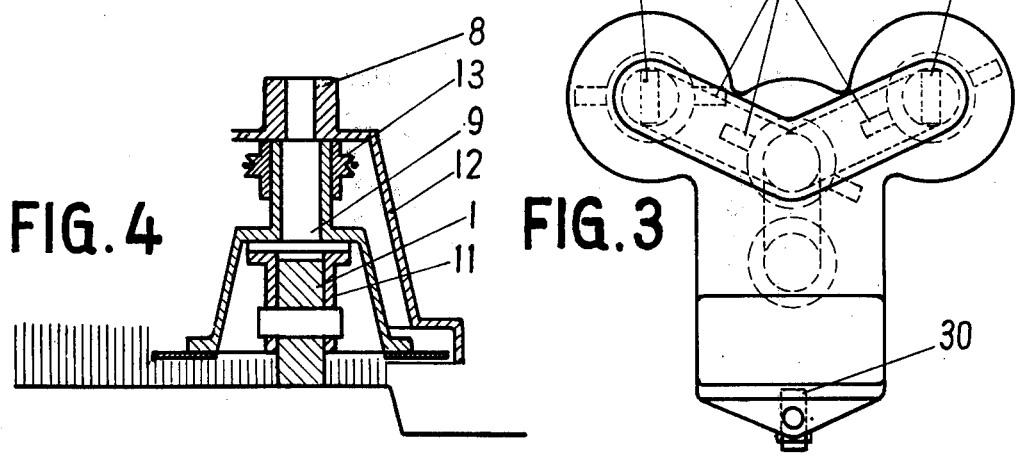
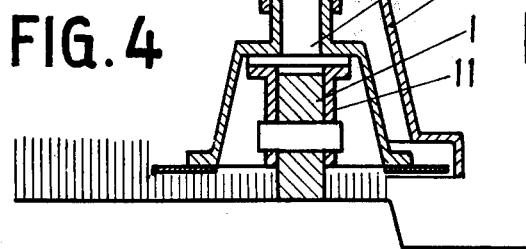

LAWN MOWER

BACKGROUND OF THE INVENTION

This application is a continuation-in-part of application Ser. No. 449,258, filed Mar. 8, 1974 and now abandoned.

The lawn mowers presently on the market have the drawback in that the carriage wheels crush the grass to be cut prior to mowing and press traces of tracks into the lawn. The pressed down grass blades are not picked up by the cutter blade and subsequently return to an upright condition and remain standing as strips extending over the entire surface of the lawn.

The reason for this drawback can be found in the fact that the carriage wheels are located on the outside of the cutting area of the rotary blade. this circumstance also makes it impossible to mow lawn surfaces that are situated at a higher level than the adjacent ground all the way to the edge, since the mower tilts before the blade encounters the outermost portions of the lawn. As a consequence, standing narrow strips of uncut lawn will remain. Furthermore, when the lawn mower tilts the blade will tend to scalp the edge of the lawn and as its operation continues it can get blocked in the ground. Because of the above and of the prevailing system of wheels, it is impossible to cut the lawn, with conventional rotary type mowers, close to walls and other interfering elements.

Lawn mowers have been constructed in the past in which a wheel is positioned within a cup-shaped hub that carries the rotary cutting blade. However, such lawn mowers which have a single wheel mounted on the axis of the cutting blade, may tend to drop as the mower moves over uneven surfaces of the lawn, causing the blade to scalp the lawn.

Since the basic type of construction of lawn mowers has now been stagnant for a long time, there has arisen a new market of additional implements, such as grass shears and edge trimmers, which market represents an economic disadvantage for the consumer. With the aid of the above mentioned auxiliary devices, it is possible to correct the drawbacks produced by the conventional lawn mowers, but the trimming operation requires considerable time.

It is also a disadvantage that generally, the conventional lawn mowers are not steerable, for instance, after making one pass it is difficult to turn the mower around for a return pass, or in the case of square mowing, to turn the mower by 90° without damaging the grass texture.

SUMMARY OF THE INVENTION

The present invention is directed to an improved rotary lawn mower construction which includes a pair of rotary blades each of which is carried by a driven cup-shaped hub. A wheel is mounted on the shaft of each hub and is located within the hub, while a third pivotable wheel is positioned to the rear of the cutting blade and is disposed along the longitudinal axis of the mower.

A steering mechanism is mounted on the handle of the mower and is connected to the rear wheel to provide steering for the mower.

With this arrangement of the blade and wheels, the cutting range of the blades, both in a longitudinal and a transverse direction, extends beyond the surface traveled by the wheels, so that the wheels move only on the cut portions of the lawn and no uncut grass is pressed into the ground by the wheels.

As the cutting area of the blade extends laterally and forwardly beyong the wheels, the wheels can be safely situated on the surface of the lawn, while the blade can cover the edge of the lawn. This construction enables the mower to cleanly cut the grass along an edge of the lawn and to cut closely adjacent obstructions, such as trees, posts, and the like.

The steering mechanism is connected to the rear wheel that is pivotable through 360°, thereby enabling the mower to be readily turned and steered during the mowing operation.

Other objects and advantages will appear in the course of the following description.

DESCRIPTION OF THE DRAWINGS

The drawings illustrate the best mode presently contemplated of carrying out the invention.

In the drawings:

FIG. 1 is a vertical section of the lawn mower taken along lines 1—1 of FIG.2;

FIG. 2 is a top plan view of the lawn mower;

FIG. 3 is a schematic top plan view of a modified form of the invention; and

FIG. 4 is a section taken along lines 4—4 of FIG. 2.

DESCRIPTION OF THE PREFERRED EMBODIMENT

The lawn mower illustrated in FIGS. 1 and 2 includes a pair of wheels 1 which are located along the axes of rotation of the rotary cutting blades, and a third wheel 2 is disposed behind the wheels 1 and serves as a steering wheel. The wheels are enclosed by a housing 3 and bracket 4 is located at the rear of the housing and carries a bearing unit 5 for the pivot mounting 6 of the steering wheel 2. The pivot mounting 6 includes a steering arm 7, as shown in FIG. 1. With this construction, the wheel 2 can pivot 360° about the pivot mounting 6.

Mounted on the upper surface of the housing 3 are bearing units 8 which journal the axles 9 that carry the wheels 1. The axles 9 are secured in a stationary manner within the bearing sleeves 8 by clamping screws 10 and the lower ends of the axles 9 carry brackets 11 that rotatably support the wheels 1. Journaled on the shaft 9 are cup-shaped rotors or hubs 12, and a pulley 13 is secured to the upper end of each rotor 12, while cutting blades 14 are mounted on the lower edge of the rotor.

The lawn mower also includes a handle assembly, including a guide support 15 which is mounted on the bracket 4 and tubular rods 16 are pivoted on the support 15. The upper ends of the rods 16 are connected together by a handle 17. Bearing bracket 18 is mounted on the central portion of the handle 17, and a steering rod 19 is pivoted to the bearing bracket. As shown in FIG. 2, cables 20 are secured to the ends of the steering rod 19 and extend through the interior of the tubular rods 16. Each cable 20 passes over a guide roller 21 or pulley and is connected to the steering arm 7 of the pivot mounting 6. With this construction, pivoting of the steering rod 19 will act to pivot the steering wheel 2 to thereby steer the mower over the ground.

Any conventional power mechanism can be employed to drive the blades 14, and as shown in the drawings, an electric motor 22 and battery 23 are utilized. The battery 23 is accessible within the housing 3 through use of a cover or lid 24.

To drive the blades, the drive shaft 25 of the motor 22 carries a double-belted pulley 26 and belts 27 are connected to the respective pulleys 13 on the cup-shaped rotors 12. Thus, operation of the motor will act through the pulley drive to rotate the rotors 12 and the blades 14.

FIG. 3 shows a modified form of the invention in which three blades 28 are located in the form of a triangle. The wheels 29, similar to wheels 1 of the first embodiment, are mounted within the driven rotors that carry the blade 28, in a manner previously described. A third wheel 30, similar in construction and operation to wheel 2, is mounted to the rear of the wheels 29. Since the construction of the blades 28 and wheels 29 is similar to that described with respect to the embodiment of FIGS. 1 and 2, the construction of FIG. 3 is shown schematically.

FIG. 4 illustrates the advantage of the mower in cutting grass along an edge of the lawn. As shown in FIG. 4, the blades 14 extend a substantial distance beyond the wheels 1, so that the wheels 1 can be positioned well back of the dropped edge of the lawn and the blade will cut the grass along the edge, thereby minimizing any possibility of the mower tilting and the blades scalping the lawn along the edge.

As the blades extend both in a longitudinal and transverse direction beyond the surface traveled by the wheels, the wheels move only on the cut portion of the lawn and no uncut grass is pressed into the ground by the wheels.

The lawn mower of the invention also has improved stability over conventional lawn mowers utilizing three wheels, in that the transverse distance wheels 1 is quite substantial and the rear wheel 2 is located a substantial distance behind the front wheels. Thus, the mower has excellent stability and the blades will not scalp the lawn areas where the lawn is not smooth or even.

In the past, three wheel mowers have been used in which a single wheel has been positioned on the axis of the cutting blade and two wheels are located to the rear of the blade. With this type of construction, the single wheel will tend to drop on uneven surfaces so that the blade may scalp the lawn. Furthermore, the coverage distance between the rear wheels and the outer edge of the cutting path inscribed by the blade is so small that grass will remain standing along the edge of the lawn, or if the mower is maneuvered in an attempt to cut the grass along the lower edge, the mower may drop and scalp the edge.

The mower construction enables portions of the lawn adjacent walls, trees or other obstructions to be cut without the danger of damaging the wheels. It is possible to cut the grass at a corner of the lawn in a single pass, and it is further possible to cut the grass around obstructions, such as trees or posts, in a single forward pass due to the steerability of the lawn mower.

Various modes of carrying out the invention are contemplated as being within the scope of the following claims particularly pointing out and distinctly claiming the subject matter of the invention.

I claim:

1. A lawn mower construction, comprising a housing, power means mounted on the housing, a pair of rotors disposed within the housing and spaced laterally of the longitudinal center line of the mower, each of said rotors having a generally cup-shaped configuration and having an open bottom end, a shaft connected to the housing to rotatably support each rotor, means for connecting the power means to each rotor to thereby rotate the same, blade means carried by the lower end of each rotor, first wheel means located within the interior of each rotor and connected to the respective shaft, second wheel means located to the rear of said first wheel means and disposed along the longitudinal center line of the mower, means for pivotally connecting the second wheel means to said housing, a handle connected to said housing, steering means movably mounted on the upper portion of the handle, and means interconnecting said steering means and said second wheel means for pivoting said second wheel means to thereby steer the mower.

2. The lawn mower of claim 1, wherein said steering means comprises a bar mounted for pivotal movement on said handle and a pair of cables being connected to an end of the bar and the opposite end of each cable being connected to said second wheel means, whereby pivotal movement of said bar will pivot said second wheel means.

3. The lawn mower of claim 2, wherein said second wheel means includes a steering arm and the opposite end of each cable is attached to said steering arm.

* * * * *